US010661732B2

(12) United States Patent
Kontani (10) Patent No.: US 10,661,732 B2
(45) Date of Patent: May 26, 2020

(54) IN-VEHICLE RELAY DEVICE (71) Applicants: AutoNetworks Technologies, Ltd., Yokkaichi, Mie (JP); Sumitomo Wiring Systems, Ltd., Yokkaichi, Mie (JP); Sumitomo Electric Industries, Ltd., Osaka-Shi (JP)

(72) Inventor: Tsuyoshi Kontani, Mie (JP)

(73) Assignees: AutoNetworks Technologies, Ltd., Yokkaichi, Mie (JP); Sumitomo Wiring Systems, Ltd., Yokkaichi, Mie (JP); Sumitomo Electric Industries, Ltd., Osaka-Shi, Osaka (JP)

( * ) Notice: Subject to any disclaimer, the term of this patent is extended or adjusted under 35 U.S.C. 154(b) by 0 days.

(21) Appl. No.: 16/345,147

(22) PCT Filed: Oct. 26, 2017

(86) PCT No.: PCT/JP2017/038650
§ 371 (c)(1),
(2) Date: Apr. 25, 2019

(87) PCT Pub. No.: WO2018/084060
PCT Pub. Date: May 11, 2018

(65) Prior Publication Data
US 2019/0283692 A1    Sep. 19, 2019

(30) Foreign Application Priority Data

Nov. 1, 2016    (JP) .................................. 2016-214485

(51) Int. Cl.
*H04B 3/36* (2006.01)
*B60R 16/023* (2006.01)
(Continued)

(52) U.S. Cl.
CPC .......... *B60R 16/0231* (2013.01); *B60R 16/02* (2013.01); *B60R 16/023* (2013.01);
(Continued)

(58) Field of Classification Search
CPC ..... H04W 4/48; G05D 1/0231; G05D 1/0242; G05D 1/0278; H04B 3/36
(Continued)

(56) References Cited

U.S. PATENT DOCUMENTS 9,800,319 B2 * 10/2017 Nakagawa ......... H04B 7/15528
2014/0298311 A1 * 10/2014 Abe ........................... G06F 8/65
717/171

(Continued)

FOREIGN PATENT DOCUMENTS

JP    H11-191084 A    7/1999
JP    2007-251828 A    9/2007

OTHER PUBLICATIONS

International Search Report, Application No. PCT/JP2017/038650, dated Jan. 9, 2018. ISA/Japan Patent Office.

*Primary Examiner* — Helene E Tayong
(74) *Attorney, Agent, or Firm* — Honigman LLP (57) ABSTRACT

An in-vehicle relay device includes: a first determination unit that determines whether or not first data is included in a received communication signal; a non-volatile storage unit that sequentially stores the first data that has been determined by the first determination unit as being included; a second determination unit that determines whether or not second data is included in the received communication signal; and a prohibition unit that, when the second determination unit has determined that the second data is included, prohibits the storage to be performed by the storage unit.

13 Claims, 5 Drawing Sheets (51) Int. Cl.
*H04W 4/48* (2018.01)
*G05D 1/02* (2020.01)
*H04L 12/46* (2006.01)
*B60R 16/02* (2006.01)

(52) U.S. Cl.
CPC ......... *G05D 1/0231* (2013.01); *G05D 1/0242* (2013.01); *G05D 1/0278* (2013.01); *H04B 3/36* (2013.01); *H04L 12/46* (2013.01); *H04W 4/48* (2018.02)

(58) Field of Classification Search
USPC ........................................................ 375/211
See application file for complete search history.

(56) References Cited

U.S. PATENT DOCUMENTS

2014/0380416 A1* 12/2014 Adachi .................. H04L 63/20
726/2
2016/0378457 A1* 12/2016 Adachi .................. G06F 9/445
713/181
2017/0111183 A1* 4/2017 Kojima .................. H04L 67/12

* cited by examiner

FIG. 1

Legend
A= Communication unit

Legend
A= Communication unit

FIG. 5

IN-VEHICLE RELAY DEVICE

CROSS-REFERENCE TO RELATED APPLICATIONS

This application is the U.S. national stage of PCT/JP2017/038650 filed Oct. 26, 2017, which claims priority of Japanese Patent Application No. JP 2016-214485 filed Nov. 1, 2016, the contents of which are incorporated herein.

TECHNICAL FIELD

The present disclosure relates to an in-vehicle relay device. This application claims priority based on Japanese Patent Application No. 2016-214485, filed Nov. 1, 2016, the entire contents of which are hereby incorporated herein by reference.

BACKGROUND

The recent increase in in-vehicle devices built into vehicles has resulted in a corresponding increase in the scale of in-vehicle networks used to exchange information among the in-vehicle devices. Configurations are therefore used in which an in-vehicle network is divided into multiple networks and an in-vehicle relay device such as a gateway is used to relay the exchange of information among the in-vehicle networks. Some in-vehicle relay devices have appeared that include, for example, functions for updating programs for ECUs (electronic control units) connected to in-vehicle networks, in addition to simple relay functions.

Specifically, J P 2014-182571A discloses an in-vehicle relay device having a multi-protocol connection with an in-vehicle electronic control unit (ECU). This in-vehicle relay device includes flash ROM (read-only memory) as high-capacity memory. New and old programs received from an information center are stored in the flash ROM, and differential data between the new and old programs is searched for and transmitted to the ECU.

Meanwhile, different ECUs handle various functions pertaining to the control of in-vehicle devices. In particular, some airbag ECUs, which are related to safety systems, record some vehicle information into internal non-volatile memory when the vehicle has experienced a collision, in addition to controlling the airbags (see the airbag control unit of JP 2006-193017A and the airbag control unit of JP 2010-85234A). The car navigation device disclosed in JP 2007-72567A, meanwhile, periodically records travel data, position data, image data of the surroundings, and line-of-sight direction data of the driver in memory along with the time.

However, with the techniques disclosed in Patent Documents 2 to 4, there is a limit on the types of the vehicle information and data recorded into the memory. Furthermore, the vehicle information that is recorded according to the disclosures disclosed in Patent Documents 3 and 4, and the data that is recorded according to the disclosure disclosed in Patent Document 5, have a problem in that the information and data are unevenly distributed to specific ECUs and specific devices, and are therefore not suited to centralized management.

Having been achieved in light of the foregoing circumstances, an object of the present disclosure is to provide an in-vehicle relay device capable of collectively recording information or data produced while a vehicle is traveling.

Advantageous Effects of Disclosure

According to the disclosure of the present application, information or data produced while a vehicle is traveling can be collectively recorded.

SUMMARY

An in-vehicle relay device according to one aspect of the present disclosure is an in-vehicle relay device that receives a communication signal transmitted from a communication device, among a plurality of in-vehicle communication devices communicatively connected by any one of a plurality of communication lines, that is connected to one communication line, and transmits the communication signal to another communication line. The in-vehicle relay device includes: a first determination unit that determines whether or not the received communication signal includes first data; a non-volatile storage unit that sequentially stores the first data determined by the first determination unit as being included; a second determination unit that determines whether or not the received communication signal includes second data; and a prohibition unit that, when the second determination unit has determined that the second data is included, prohibits the storage to be performed by the storage unit.

Note that the present application can be realized not only as an in-vehicle relay device including such characteristic processing units, but also as an in-vehicle relay method that takes the characteristic processes as steps, a program for causing a computer to execute such steps, and so on. The in-vehicle relay device can also be partially or entirely realized as a semiconductor integrated circuit, or as a different system including a in-vehicle relay device.

DETAILED DESCRIPTIONS OF PREFERRED EMBODIMENTS

First, embodiments of the present disclosure will be described as examples. The embodiments described hereinafter may be at least partially combined as desired.

An in-vehicle relay device according to one aspect of the present disclosure is an in-vehicle relay device that receives a communication signal transmitted from a communication device, among a plurality of in-vehicle communication devices communicatively connected by any one of a plurality of communication lines, that is connected to one communication line, and transmits the communication signal to another communication line. The in-vehicle relay device includes: a first determination unit that determines whether or not the received communication signal includes first data; a non-volatile storage unit that sequentially stores the first data determined by the first determination unit as being included; a second determination unit that determines whether or not the received communication signal includes second data; and a prohibition unit that, when the second determination unit has determined that the second data is included, prohibits the storage to be performed by the storage unit.

In this aspect, a communication signal transmitted from the in-vehicle communication device connected to any one of the plurality of communication lines is received, the communication line serving as the relay destination is specified on the basis of the destination of the received communication signal, and the received communication signal is transmitted to the specified communication line to be relayed. During the relay, the first data included in the received communication signal is extracted and stored in sequence in the non-volatile storage unit, and if the second data is included in the communication signal, storage into the storage unit is not carried out thereafter. As a result, the first data stored before the communication signal including the second data was received is held in the storage unit.

Preferably, the in-vehicle relay device further includes an obtainment unit that obtains data indicating a time, and when storing the first data, the storage unit stores the first data along with the data obtained by the obtainment unit.

In this aspect, the first data is stored in the storage unit along with the data indicating a time, and thus the time at which an event corresponding to the first data occurred can be specified.

Preferably, the prohibition unit prohibits storage in the storage unit after a prescribed amount of time has passed from when the second determination unit determines that the second data is included.

In this aspect, if the second data is included in the received communication signal, the storage of the first data is continued for the prescribed amount of time, and the storage into the storage unit is not carried out after the prescribed amount of time has passed. As a result, the first data extracted from the communication signal between when the communication signal including the second data was received and when the prescribed amount of time has passed can furthermore be held in the storage unit.

Preferably, the first data is at least one of the following: imaging data from inside and outside the vehicle, captured by a camera; sensing data from a millimeter wave sensor, an infrared sensor, and a LIDAR (Light Detection and Ranging) sensor; position data from a GPS (Global Positioning System); vehicle speed data from a vehicle speed sensor; acceleration data from an accelerometer; data indicating an accelerator position based on the depression of an accelerator pedal; data indicating a brake position based on the depression of a brake pedal; data indicating a steering angle; data indicating a state of autonomous driving of a host vehicle; data indicating a driving state of a driver; and data pertaining to an occupant aside from the driver.

In this aspect, when at least one of the following types of data is included in a received communication signal, that data is extracted and stored in the storage unit, the stated data being the imaging data from inside and outside the vehicle; sensing data from the millimeter wave sensor, the infrared sensor, and the LIDAR sensor; position data; vehicle speed data; acceleration data; data indicating an accelerator position; data indicating a brake position; data indicating a steering angle; data indicating a state of autonomous driving data indicating a driving state of the driver; and data pertaining to occupants. Through this, data pertaining to autonomous driving in particular can be stored in the storage unit.

Preferably, one communication line is compliant with the Ethernet (registered trademark) communication standard, and the imaging data is included in a communication signal based on the communication standard.

In this aspect, the imaging data, which is included in the Ethernet communication signal and is transferred to the in-vehicle relay device over the Ethernet communication line, is received, and thus even high-bit rate imaging data can be stored in the storage unit.

Preferably, the storage unit stores a computer program to be transmitted to a communication device having a processor that executes a process based on a computer program stored in rewritable memory.

In this aspect, the update computer program to be transmitted to the communication device is stored in the storage unit, and thus a storage region for the update computer program can be shared with a storage region for the first data, reducing the overall storage size in the storage unit.

Specific examples of the in-vehicle relay device according to embodiments of the present disclosure will be described hereinafter with reference to the drawings. Note that the present disclosure is not intended to be limited to these examples, and is defined instead by the scope of the appended claims. All changes that fall within the same essential spirit as the scope of the claims are intended to be included therein as well. The technical features disclosed in the embodiments can be combined with each other as well.

First Embodiment

Figure 1:
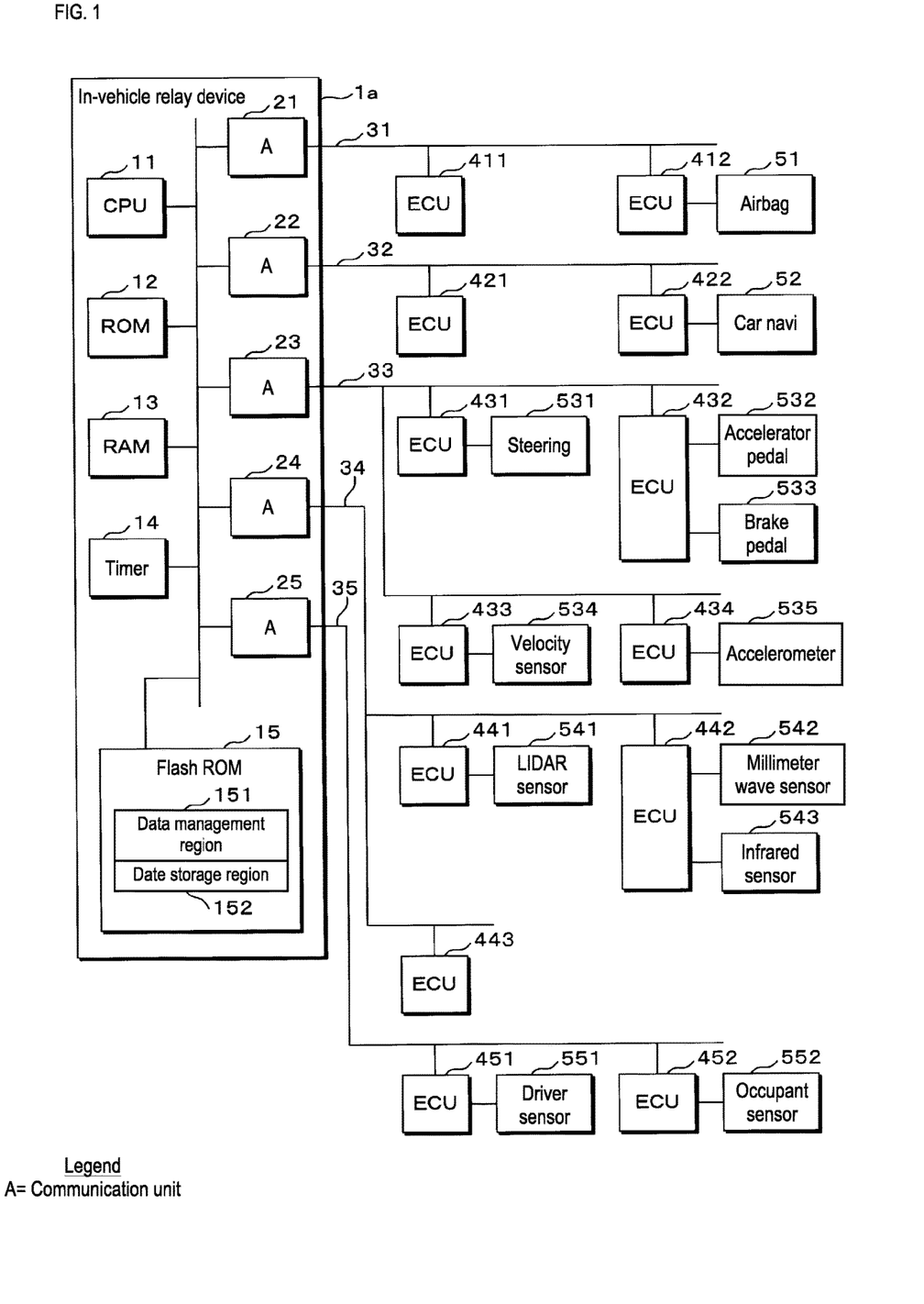
FIG. 1 is a block diagram illustrating the configuration of an in-vehicle communication system including an in-vehicle relay device according to a first embodiment of the present disclosure.

FIG. 1 is a block diagram illustrating the configuration of an in-vehicle communication system including an in-vehicle relay device according to a first embodiment of the present disclosure. In the drawing, 1a indicates the in-vehicle relay device, and the in-vehicle relay device 1a includes a microcomputer having a CPU (Central Processing Unit) 11. The CPU 11 is connected by a bus to ROM 12, which stores information such as programs, RAM (Random Access Memory) 13, which temporarily stores information that has been produced, a timer 14 that measures the passage of time and the like, and flash ROM (corresponding to a "non-volatile storage unit") 15.

Furthermore, communication units 21, 22, 23, 24, and 25, which communicate in compliance with a communication standard such as CAN (Controller Area Network), LIN (Local Interconnect Network), MOST (Media Oriented Systems Transport), AVTP (Audio Video Transport Protocol), or FlexRay (registered trademark), are connected to the CPU 11 by the bus. The flash ROM 15 includes a data management region 151 and a data storage region 152, which will be described in detail later.

The communication unit 21 is communicatively connected to ECUs 411 and 412 by a safety system communication line 31. The ECU 412 controls an airbag 51 when a collision sensor (not shown) has detected that the host vehicle has experienced a collision, and also transmits a communication signal including data pertaining to the collision (corresponding to "second data"; called "predetermined data" hereinafter) to other ECUs and/or the in-vehicle relay device 1a.

The communication unit 22 is communicatively connected to ECUs 421 and 422 by a multimedia system communication line 32. The ECU 422 transmits a communication signal including position data of the host vehicle, obtained from a car navigation device (called a "car navi" hereinafter) 52 having GPS functionality, to other ECUs and/or the in-vehicle relay device 1a. The ECU 422 also transmits a communication signal including data indicating a time obtained from the car navi 52 (also called "time data" hereinafter) as a response signal in response to a request from the in-vehicle relay device 1a or another ECU.

The communication unit 23 is communicatively connected to ECUs 431, 432, 433, and 434 by a chassis system communication line 33. The ECU 431 controls a steering device 531 and transmits a communication signal including data indicating a steering angle to other ECUs and/or the in-vehicle relay device 1a. The ECU 432 controls an ABS (Antilock Brake System), for example, and transmits a communication signal including data indicating an accelerator position and brake position based on the depression of an accelerator pedal 532 and a brake pedal 533, respectively, to another ECU and/or the in-vehicle relay device 1a. The ECUs 433 and 434 are connected to a velocity sensor 534 and an accelerometer 535, respectively, and transmit a communication signal including vehicle speed data and a communication signal including acceleration data to other ECUs and/or the in-vehicle relay device 1a.

The communication unit 24 is communicatively connected to ECUs 441, 442, and 443 by an autonomous driving system communication line 34. The ECU 441 transmits a communication signal including sensing data from a LIDAR sensor 541 to other ECUs and/or the in-vehicle relay device 1a. The ECU 442 transmits a communication signal including sensing data from a millimeter wave sensor 542 and an infrared sensor 543 to other ECUs and/or the in-vehicle relay device 1a. The ECU 443 is an ECU that comprehensively controls autonomous driving, and transmits a communication signal including data indicating a state of autonomous driving of the host vehicle to other ECUs and/or the in-vehicle relay device 1a.

A communication unit 25 is communicatively connected to ECUs 451 and 452 by a body system communication line 35. The ECU 451 transmits a communication signal including data expressing a driving state of the driver, obtained from a driver sensor 551 such as a line-of-sight sensor and a head position sensor for the driver, to other ECUs and/or the in-vehicle relay device 1a. The ECU 452 transmits a communication signal including data pertaining to occupants, obtained from an occupant sensor 552 such as a seat sensor for occupants aside from the driver, to other ECUs and/or the in-vehicle relay device 1a.

Note that the correspondence between the communication lines and the ECUs is determined by the connection between the in-vehicle relay device 1a and an external device, and is not limited to that illustrated in FIG. 1. For example, the ECUs 441, 442, and 443 may be communicatively connected to the in-vehicle relay device 1a by the communication line 33 or 35. Additionally, the in-vehicle devices connected to the ECUs are not limited to those illustrated in FIG. 1, and for example, the accelerator pedal 532 may be connected to an ECU aside from the ECU 432.

In the above-described configuration, the in-vehicle relay device 1a determines, in time series, whether or not communication signals have been received by any of the communication units 21, 22, 23, 24, and 25, and if specific data (corresponding to "first data") is included in the received communication signals, the specific data is extracted and sequentially stored in the data storage region 152. The data is stored in the data storage region 152 on the basis of the content of the data management region 151.

Here, this specific data is at least one of the following: the sensing data of the millimeter wave sensor 542 and the infrared sensor 543, from the ECU 442; the sensing data of the LIDAR sensor 541, from the ECU 441; the position data from the ECU 422; the vehicle speed data from the ECU 433; the acceleration data from the ECU 434; the data indicating the accelerator position and the data indicating the brake position, from the ECU 432; the data indicating the steering angle, from the ECU 431; the data indicating the state of autonomous driving of the host vehicle, from the ECU 443; the data indicating the driving state of the driver, from the ECU 451; and the data indicating the occupants, from the ECU 452.

Figure 2:
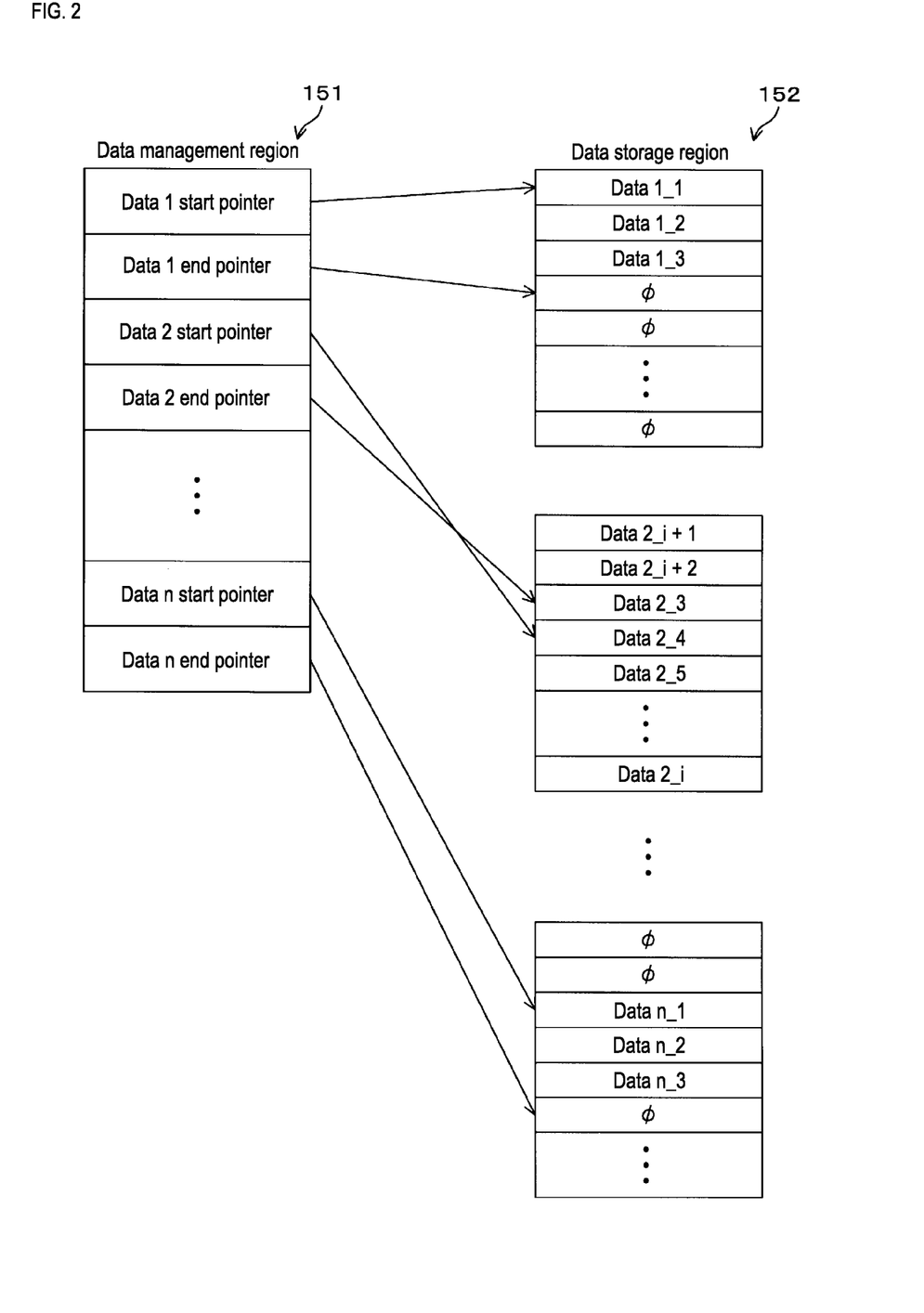
FIG. 2 is a diagram schematically illustrating the content of a data management region and a data storage region.

FIG. 2 is a diagram schematically illustrating the content of the data management region 151 and the data storage region 152. The data storage region 152 secures regions for sequentially storing a plurality of pieces of data, namely data 1, data 2, . . . , data n (where n is an integer of 2 or more), which serve as the specific data. However, it is assumed that the sizes of the n types of data are constant. The data management region 151 stores a start pointer and an end pointer for each storage region of the data 1, data 2, . . . , data n.

The start pointer indicates a memory address (also simply called an "address" hereinafter) in which the oldest data among the storage regions of the data is stored. The end pointer indicates a memory address where the data following the newest data among the storage regions of the data is to be stored. Accordingly, the details of the start pointer and the end pointer are the same when no data is stored in the data storage regions. Each time a piece of data is written into each data storage region, the details of the end pointer is incremented by the size equivalent to the corresponding piece of data.

Specifically, three pieces each of data, namely data 1_1, 1_2, and 1_3 and data n_1, n_2, and n_3, are stored in the storage regions of the data 1 and the data n indicated in FIG. 2. Regions where the stored content is undefined are indicated by "φ". The storage regions for data 1 and data 2 indicate that the details of the start pointer and the end pointer have been reset to the starting addresses of the storage regions. The storage region for data n indicates that the details of the start pointer and the end pointer have been reset to an address where the third piece of data from the start of the storage region is to be stored.

If the address indicated by the end pointer is outside the storage region of the corresponding piece of data, the starting address of the corresponding storage region is written into the end pointer. Additionally, if the details of the end pointer match the details of the start pointer, the details of the start pointer are overwritten with the address where the next data is to be stored. At this time, the oldest piece of data is discarded. Specifically, in the storage regions for i pieces of data 2, indicated in FIG. 2, data 2_1 and data 2_2 (neither of which are shown) are already overwritten with data 2_i+1 and data 2_i+2, and data 2_3 is overwritten with data 2_i+3 and discarded when the newest data is stored next.

In this manner, each data storage region corresponds to what is known as a ring buffer or FIFO (First-In First Out) memory. In addition to the start pointer and the end pointer, the starting address, the ending address, and the data size of each data storage region is stored in the data management region 151, but these are not illustrated here. In the example illustrated in FIG. 2, an independent storage region is provided for each piece of data. However, the configuration is not limited thereto, and for example, all of the data 1, data 2, . . . , data n may be made identifiable by data type and stored in a single storage region in the order in which the data was produced.

Furthermore, if a received communication signal includes data indicating a collision transmitted from the ECU 412, the timer 14 starts measuring time, and the in-vehicle relay device 1a does not store data in the data storage region 152 when the timer 14 has measured a prescribed amount of time. As a result, the specific data continues to be stored in the store region only for the prescribed amount of time following a vehicle collision.

Figure 3:
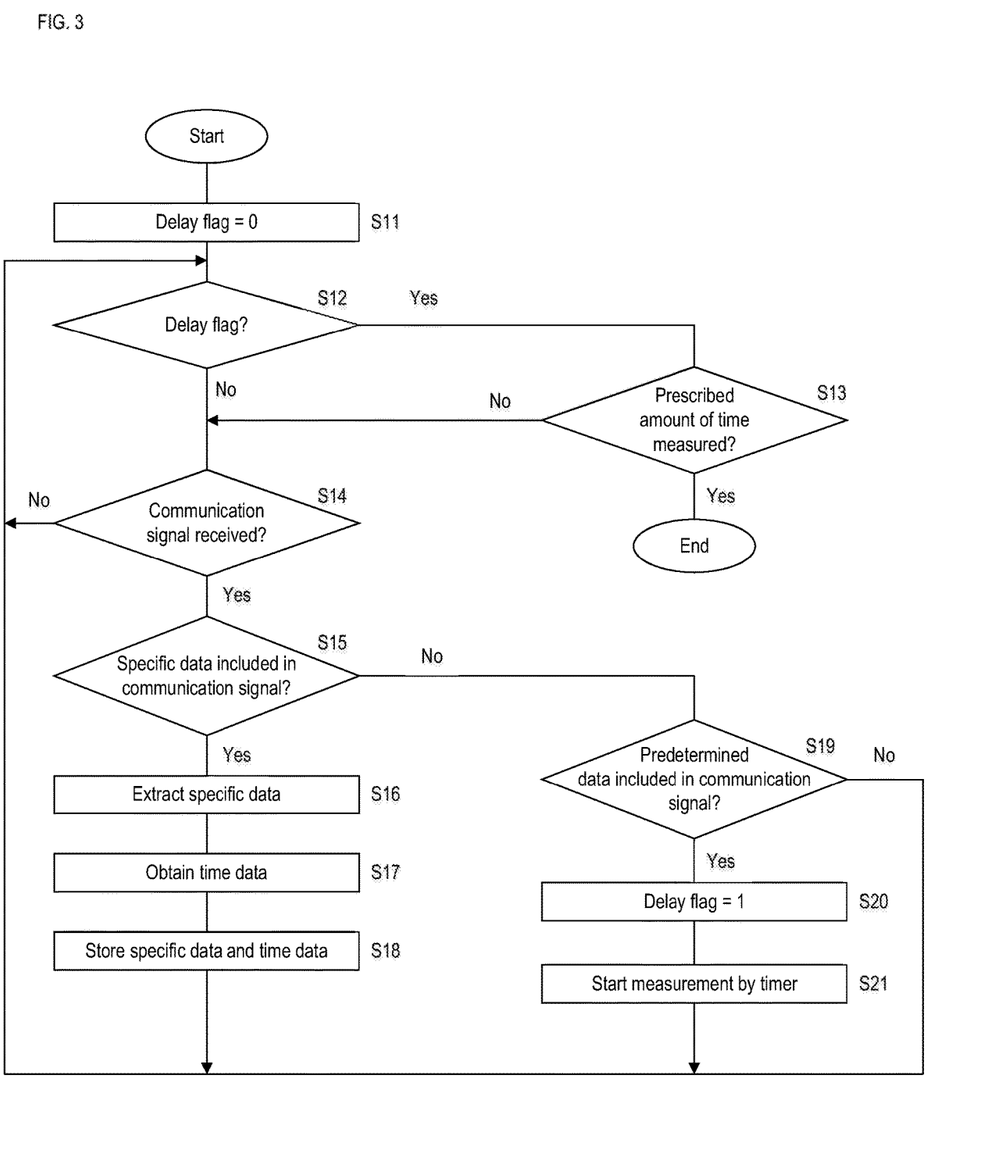
FIG. 3 is a flowchart illustrating a processing sequence carried out by a CPU for extracting specific data included in a communication signal and storing that data in a storage region.

Operations of the above-described in-vehicle relay device 1a will be described hereinafter using flowcharts illustrating those operations. FIG. 3 is a flowchart illustrating a processing sequence carried out by the CPU 11 for extracting the specific data included in a communication signal and storing that data in the data storage region 152. The delay flag in the drawing is a flag indicating that the prescribed amount of time is being measured when the communication signal includes predetermined data, and is stored in the RAM 13. The processing of FIG. 3 is started when the in-vehicle relay device 1a starts relay operations.

When the processing in FIG. 3 is started, the CPU 11 clears the delay flag to 0 as a reset process (S11). Next, the CPU 11 determines whether or not the delay flag is set to 1 (S12). If the delay flag is set to 1 (S12: YES), the CPU 11 further determines whether or not the timer 14 has measured the prescribed amount of time (S13), and if the prescribed amount of time has been measured (S13: YES), the processing in FIG. 3 ends (corresponding to a "prohibition unit". Storage in the data storage region 152 is prohibited thereafter.

If the delay flag is not set to 1 in step S12 (S12: NO), or if the timer 14 has not yet measured the prescribed amount of time in step S13 (S13: NO), the CPU 11 determines whether or not a communication signal has been received from one of the communication units (S14). If a communication signal has not been received (S14: NO), the process moves to step S12, and the processing from step S12 to step S14 is repeated.

On the other hand, if a communication signal has been received (S14: YES), the CPU 11 determines whether or not the received communication signal includes the above-described specific data (S15; corresponding to a "first determination unit"). If the specific data is included (S15: YES), the specific data is extracted from the communication signal (S16). At this time, the CPU 11 obtains the time data from the ECU 422 (S17; corresponding to an "obtainment unit"), stores the extracted specific data and the obtained time data in the data storage region 152 in accordance with the specific data (S18), and moves the process to step S12. If the in-vehicle relay device 1a is provided with a clock such as a real time clock, the CPU 11 may obtain the time data from the real time clock (this also corresponds to the "obtainment unit").

If in step S15 the received communication signal does not include the specific data (S15: NO), the CPU 11 determines whether or not the received communication signal includes the above-described predetermined data, i.e., the data indicating a collision (S19; corresponding to a "second determination unit"). If the predetermined data is included (S19: YES), the delay flag is set to 1 (S20), the timer 14 starts measuring time (S21), and the process moves to step S12. On the other hand, if in step S19 the received communication signal does not include the above-described predetermined data (S19: NO), the CPU 11 moves the process to step S12 without carrying out any special processing.

In the above-described flowchart, when the received communication signal includes data indicating a collision, the CPU 11 continues storing in the data storage region 152 for the prescribed amount of time. However, the CPU 11 may instead stop (i.e., prohibit) the storage in the data storage region 152 without waiting for the prescribed amount of time, for example. Also, for example, if an emergency interrupt for power cutoff has been made while continuing the storage into the data storage region 152 for the prescribed amount of time, a process for saving the content stored in the data storage region 152, securely protecting the content, and so on may be carried out immediately.

According to the present first embodiment as described thus far, a communication signal transmitted from the in-vehicle ECU 422, 431, 432, 433, 434, 441, 442, 443, 451, or 452 connected to any one of the communication lines 31, 32, 33, 34, and 35 is received, the communication line serving as the relay destination is specified on the basis of the destination of the received communication signal, and the received communication signal is transmitted to the specified communication line to be relayed. During the relay, the specific data (the first data) included in the received communication signal is extracted and stored in sequence in the data storage region 152 of the flash ROM 15, and if data indicating a collision (the second data) is included in the communication signal, storage into the data storage region 152 is not carried out thereafter. As a result, the specific data stored before the communication signal including the data indicating a collision was received can be held in the data storage region 152.

Additionally, according to the first embodiment, the specific data is stored in the data storage region 152 along with the time data, and thus the time at which an event corresponding to the specific data occurred can be specified.

Furthermore, according to the first embodiment, if data indicating a collision is included in the received communication signal, the storage of the specific data is continued for the prescribed amount of time, and the storage into the data storage region 152 is not carried out after the prescribed amount of time has passed. As a result, the specific data extracted from the communication signal between when the communication signal including data indicating a collision was received and when the prescribed amount of time has passed can furthermore be held in the data storage region 152.

Second Embodiment

Figure 4:
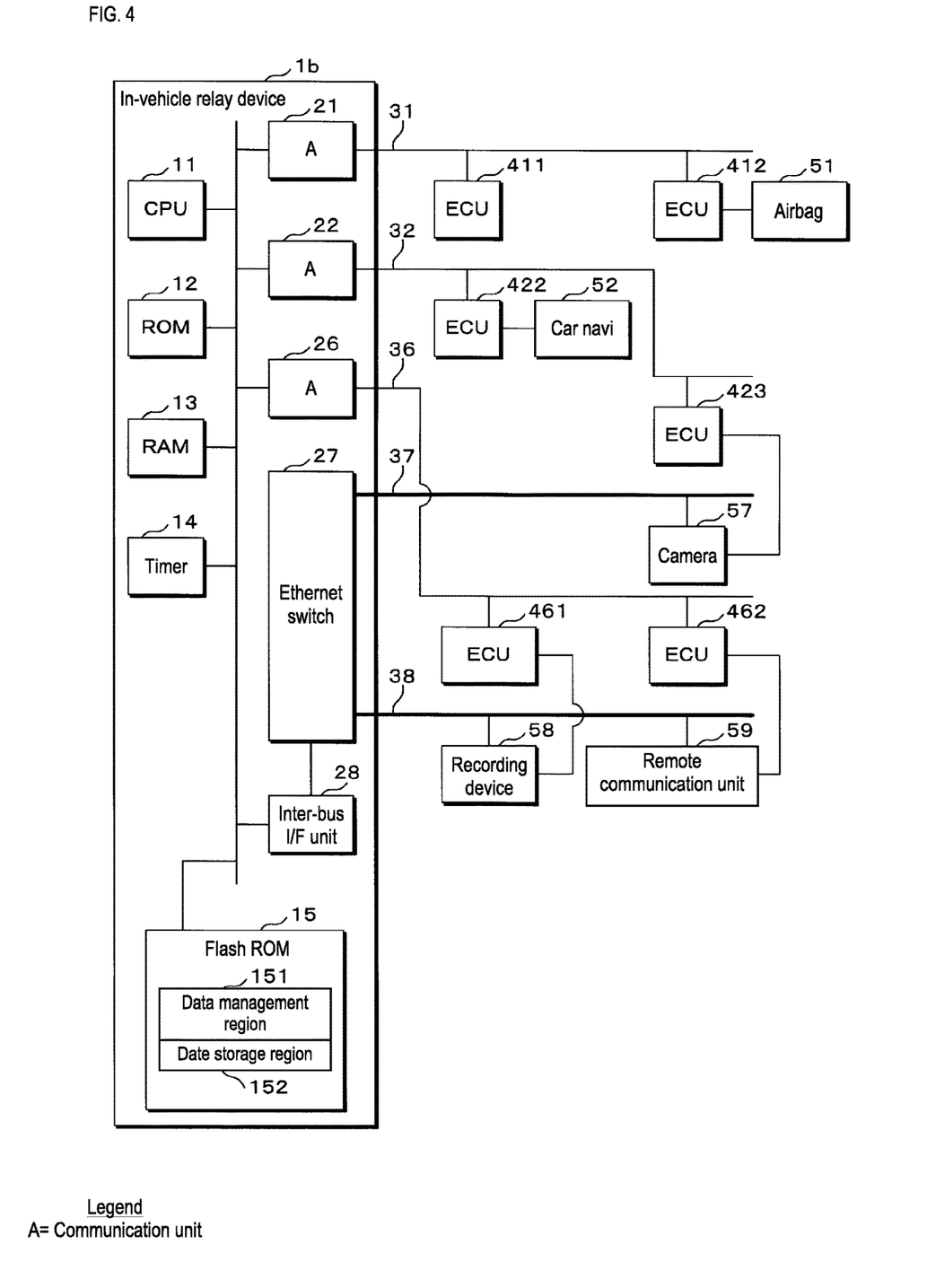
FIG. 4 is a block diagram illustrating the configuration of an in-vehicle communication system including an in-vehicle relay device according to a second embodiment of the present disclosure.

While the first embodiment is an embodiment in which imaging data from a camera is not explicitly relayed, the second embodiment is an embodiment in which imaging data is switched using an Ethernet switch and relayed. FIG. 4 is a block diagram illustrating the configuration of an in-vehicle communication system including an in-vehicle relay device according to a second embodiment of the present disclosure. In the drawing, 1b indicates the in-vehicle relay device, and the in-vehicle relay device 1b includes a microcomputer having the CPU 11.

The CPU 11 is connected to the ROM 12, the RAM 13, the timer 14, the flash ROM 15, communication units 21 and 22, and a communication unit 26 by a bus. Furthermore, an Ethernet switch 27, which on the basis of destination MAC addresses of communication signals from communication lines 37 and 38 that are compliant with the Ethernet communication standard switches the Ethernet communication signals, is connected to the CPU 11 via an inter-bus I/F unit 28. The inter-bus I/F unit 28 is an interface between a switching bus (not shown) in the Ethernet switch 27 and the CPU 11 bus. The Ethernet switch 27 and the inter-bus I/F unit 28 correspond to "communication units".

The communication unit 22 is communicatively connected to the ECUs 422 and 423 by the communication line 32. The ECU 423 controls the capturing of images inside and outside the vehicle by a camera 57. Imaging data from the camera 57 is included in a communication signal whose destination is a recording device 58, and is transmitted over the communication line 37.

The communication unit 26 is communicatively connected to ECUs 461 and 462 by a diagnostic system communication line 36. The ECU 461 controls the recording of the imaging data by the recording device 58. The recording device 58 is a drive recorder that records the imaging data transmitted over the communication line 38 after having been switched by the Ethernet switch 27. The ECU 462 controls communication with a web server provided by a remote communication unit 59. The remote communication unit 59 is a unit for transmitting data transferred at high speeds over the communication line 38 to the web server (not shown).

Note that the ECU 423 and the camera 57 may be connected in common to the communication line 37, the ECU 461 and the recording device 58 may be connected in common to the communication line 38, and the ECU 462 and the remote communication unit 59 may be connected in common to the communication line 38. Aside from this, the same reference signs are appended to parts that correspond to those in the first embodiment, and descriptions thereof will be omitted.

In the above-described configuration, the in-vehicle relay device 1b determines, in time series, whether or not communication signals have been received by any of the communication units 21, 22, and 26 and the Ethernet switch 27, and if specific data (corresponding to "first data") is included in the received communication signals, the specific data is extracted and sequentially stored in the data storage region 152. The data 1, data 2, . . . , data n stored in the data storage region 152 is later transmitted to the web server (not shown).

Here, the specific data is at least one of position data from the ECU 422 and imaging data from the camera 57, but connections may be made with the ECUs described in the first embodiment and illustrated in FIG. 1, and other specific data may be stored in the data storage region 152.

The method of storing the data in the data storage region 152 is the same as in the first embodiment. A flowchart illustrating operations of the in-vehicle relay device 1b is also the same as that described in the first embodiment and illustrated in FIG. 3, and thus the flowchart and the descriptions thereof will not be given here.

In the present second embodiment, the Ethernet communication signal including imaging data is relayed to the recording device 58 through switching by the Ethernet switch 27, but the configuration is not limited thereto. For example, a standard Ethernet communication unit may be provided instead of the Ethernet switch 27 and the inter-bus I/F unit 28, with the camera 57 caused to transmit the communication signal including the imaging data to the in-vehicle relay device, and the imaging data included in the communication signal received by the Ethernet communication unit stored in the data storage region 152. Even in this case, the data stored in the data storage region 152 is later transmitted to the web server.

According to the present second embodiment as described thus far, the imaging data of the camera 57, which is included in the Ethernet communication signal and is transferred to the in-vehicle relay device 1b over the Ethernet communication line 37, is received and taken in by the Ethernet switch 27 or an Ethernet communication unit. Accordingly, even high-bit rate imaging data can be stored in the data storage region 152.

Additionally, according to the first and second embodiments, when at least one of the following types of data is included in a received communication signal, that data is extracted and stored in the data storage region 152, the stated data being the imaging data from inside and outside the vehicle; sensing data from the millimeter wave sensor 542, the infrared sensor 543, and the LIDAR sensor 541; position data; vehicle speed data; acceleration data; data indicating an accelerator position; data indicating a brake position; data indicating a steering angle; data indicating a state of autonomous driving data indicating a driving state of the driver; and data pertaining to occupants. Through this, data pertaining to autonomous driving in particular can be stored in the data storage region 152.

Third Embodiment

Figure 5:
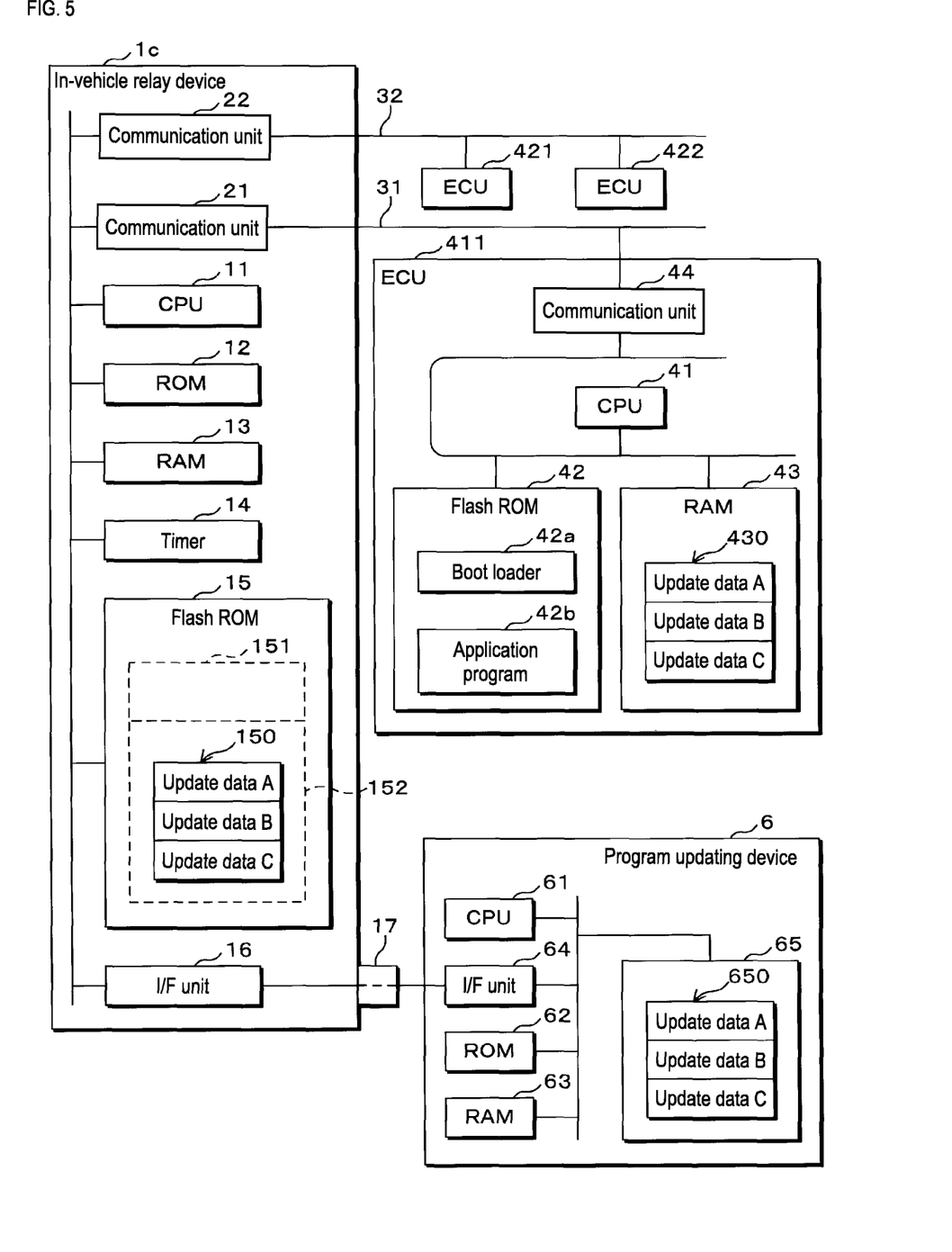
FIG. 5 is a block diagram illustrating the configuration of an in-vehicle communication system including an in-vehicle relay device according to a third embodiment of the present disclosure.

The first and second embodiments are embodiments in which the in-vehicle relay devices 1a and 1b do not have a function for storing update computer programs for the ECUs (also called simply "update programs" hereinafter). However, the third embodiment is an embodiment in which the in-vehicle relay device stores, in the flash ROM 15, update programs to be transmitted to the ECUs. FIG. 5 is a block diagram illustrating the configuration of an in-vehicle communication system including an in-vehicle relay device according to the third embodiment of the present disclosure. In the drawing, 1c indicates the in-vehicle relay device, and the in-vehicle relay device 1c includes a microcomputer having the CPU 11.

The CPU 11 is connected to the ROM 12, the RAM 13, the timer 14, the flash ROM 15, the communication units 21 and 22, and an I/F unit 16 by a bus. The I/F unit 16 is a unit for interfacing with an external program updating device 6 over an OBD (On-Board Diagnostics) connector 17.

The ECU 411 includes a microcomputer having a CPU 41 (corresponding to a "processor"). The CPU 41 is connected to flash ROM 42, RAM 43, and a communication unit 44 for communicating with the in-vehicle relay device 1c over the communication line 31 by a bus. The flash ROM 42 (corresponding to "rewritable memory") stores an application program 42b (corresponding to a "computer program") and a boot loader 42a for loading an update program for the application program 42b and overwriting the application program 42b.

The program updating device 6 includes a microcomputer having a CPU 61. The CPU 61 is connected to ROM 62, RAM 63, an I/F unit 64 for interfacing with the in-vehicle relay device 1c, and an internal storage device 65 by a bus. An update program 650 for the ECU 411, for example, is stored in the internal storage device 65. The update program 650 is divided into update data A, update data B, and update data C.

Aside from this, the same reference signs are appended to parts that correspond to those in the first embodiment, and descriptions thereof will be omitted.

In the above-described configuration, when the host vehicle is stopped, the specific data is not stored in the data storage region 152. In this state, the update program 650 is transmitted from the program updating device 6 to the in-vehicle relay device 1c in the order of the update data A, the update data B, and the update data C. The in-vehicle relay device 1c stores the received update program 650 as an update program 150 (corresponding to a "computer program to be transmitted to a communication device") in the flash ROM 15. In this case, the update program 150 is also stored in the data storage region 152 and/or the data management region 151, which reduces the overall storage size in the flash ROM 15.

The update program 150 stored in the flash ROM 15 is transmitted to the ECU 411 via the communication unit 21 and the communication line 31. The CPU 41 of the ECU 411 temporarily stores the update program 150 received by the communication unit 44 in the RAM 43 as an update program 430. Thereafter, the CPU 41 shifts control to the boot loader 42a, after which the application program 42b is overwritten with the update program 430 and the program update is completed.

According to the present third embodiment as described thus far, the update computer program 150 to be transmitted to the ECU 411 is stored in the data storage region 152, and thus the overall storage size in the flash ROM 15 can be reduced.

The invention claimed is:

1. An in-vehicle relay device that receives a communication signal transmitted from a communication device, among a plurality of in-vehicle communication devices communicatively connected by any one of a plurality of communication lines, that is connected to one communication line, and transmits the communication signal from a sensor to another communication line, the in-vehicle relay device comprising:
   a first determination unit that determines whether or not the received communication signal includes first data, the first data being a signal from the sensor:
   a non-volatile storage unit that sequentially stores the first data determined by the first determination unit as being included;
   a second determination unit that determines whether or not the received communication signal includes second data, the second data being a signal from the sensor transmitted subsequent to the first data: and
   a prohibition unit that, when the second determination unit has determined that the second data is included, prohibits the storage to be performed by the storage unit.

2. The in-vehicle relay device according to claim 1, further comprising an obtainment unit that obtains data indicating a time,
   wherein when storing the first data, the storage unit stores the first data along with the data obtained by the obtainment unit.

3. The in-vehicle relay device according to claim 2, wherein the prohibition unit prohibits storage in the storage unit after a prescribed amount of time has passed from when the second determination unit determines that the second data is included.

4. The in-vehicle relay device according to claim 2, wherein the signal is at least one of the following: imaging data from inside and outside the vehicle, captured by a camera; sensing data from a millimeter wave sensor, an infrared sensor, and a LIDAR (Light Detection and Ranging) sensor; position data from a GPS (Global Positioning System); vehicle speed data from a vehicle speed sensor; acceleration data from an accelerometer; data indicating an accelerator position based on the depression of an accelerator pedal; data indicating a brake position based on the depression of a brake pedal; data indicating a steering angle; data indicating a state of autonomous driving of a host vehicle; data indicating a driving state of a driver; and data pertaining to an occupant aside from the driver.

5. The in-vehicle relay device according to claim 2, wherein the storage unit stores a computer program to be transmitted to a communication device having a processor that executes a process based on a computer program stored in rewritable memory.

6. The in-vehicle relay device according to claim 1, wherein the prohibition unit prohibits storage in the storage unit after a prescribed amount of time has passed from when the second determination unit determines that the second data is included.

7. The in-vehicle relay device according to claim 6, wherein the signal is at least one of the following: imaging data from inside and outside the vehicle, captured by a camera; sensing data from a millimeter wave sensor, an infrared sensor, and a LIDAR (Light Detection and Ranging) sensor; position data from a GPS (Global Positioning System); vehicle speed data from a vehicle speed sensor; acceleration data from an accelerometer; data indicating an accelerator position based on the depression of an accelerator pedal; data indicating a brake position based on the depression of a brake pedal; data indicating a steering angle; data indicating a state of autonomous driving of a host vehicle; data indicating a driving state of a driver; and data pertaining to an occupant aside from the driver.

8. The in-vehicle relay device according to claim 6, wherein the storage unit stores a computer program to be transmitted to a communication device having a processor that executes a process based on a computer program stored in rewritable memory.

9. The in-vehicle relay device according to claim 1, wherein the signal is at least one of the following: imaging data from inside and outside the vehicle, captured by a camera; sensing data from a millimeter wave sensor, an infrared sensor, and a LIDAR (Light Detection and Ranging) sensor; position data from a GPS (Global Positioning System); vehicle speed data from a vehicle speed sensor; acceleration data from an accelerometer; data indicating an accelerator position based on the depression of an accelerator pedal; data indicating a brake position based on the depression of a brake pedal; data indicating a steering angle; data indicating a state of autonomous driving of a host vehicle; data indicating a driving state of a driver; and data pertaining to an occupant aside from the driver.

10. The in-vehicle relay device according to claim 9,
    wherein one communication line is compliant with the Ethernet (®) communication standard; and
    the imaging data is included in a communication signal compliant with the communication standard.

11. The in-vehicle relay device according to claim 10, wherein the storage unit stores a computer program to be transmitted to a communication device having a processor that executes a process based on a computer program stored in rewritable memory.

12. The in-vehicle relay device according to claim 9, wherein the storage unit stores a computer program to be transmitted to a communication device having a processor that executes a process based on a computer program stored in rewritable memory.

13. The in-vehicle relay device according to claim 1, wherein the storage unit stores a computer program to be transmitted to a communication device having a processor that executes a process based on a computer program stored in rewritable memory.

* * * * *